July 1, 1969

D. D. TOMLINSON 3,452,420

WIRE RETAINING METHOD

Filed Dec. 14, 1966

INVENTOR: DENVER D. TOMLINSON by CHARLES S. McGUIRE

ATTORNEY

United States Patent Office 3,452,420
Patented July 1, 1969

3,452,420
WIRE RETAINING METHOD
Denver D. Tomlinson, El Cerrito, Calif., assignor to GPE Controls, Inc., Morton Grove, Ill., a corporation of Illinois
Filed Dec. 14, 1966, Ser. No. 601,760
Int. Cl. B21f 35/00; B23k 19/00
U.S. Cl. 29—439                                      3 Claims

ABSTRACT OF THE DISCLOSURE

A method for retaining the end of a wire in a fixed position by bending, first over a hollow tube through which the wire is threaded and again over a collar which is inserted over both the tube and the portion of the wire bent thereover.

---

This invention relates to novel methods for retaining the end of a tensioned wire in a fixed position.

In many instances it is necessary to secure a length of wire in a taut or tensioned condition, which requires some means for securing the ends of the wire in a fixed position without slippage. The most common method, of course, is to wind the wire around some anchoring means at each end, or to engage the ends firmly between a pair of slippage members, or the like. In some applications it is desirable to have a standard, simple and efficient means and method for securing the ends of a wire in a firm position, particularly where the wire is used as one element in a more complex system. The present invention is directed toward providing such a means and method, and thus finds general application in this area. For illustrative purposes, however, the invention will be shown in a particular application to which it is especially well suited so that it may be more fully understood with reference to prior art devices which it is designed to replace.

It is a common practice to gauge the level of liquid in large containers, e.g. petroleum storage tanks, by attaching a tape to a float device which assumes a vertical position in accordance with the liquid level in the tank. The tape is normally associated with a gauge head of some type which is positioned outside the tank. The tape, and/or means within the gauge head, are properly calibrated to provide readings of tank liquid level in accordance with the position of the tape as determined by the vertical position of the float device. It is essential, of course, that the horizontal position of the float device remain constant, that is, that the float move up and down in a straight line as the liquid level within the tank changes.

The usual means employed to insure straight vertical movement of the float device is one or more guide lines or wires which are stretched between the floor and roof of the tank and pass loosely through some eye means attached to the float device. Again, it is important that the guide wires be under tension at all times to insure that no slack in the wires could allow horizontal movement of the float device. One convenient means of achieving this result is to fixedly attach one end of the wire to means positioned at a lower interior portion of the tank and to retain the upper end upon means which are movable with respect to the tank roof but biased toward upward movement. Such means will constantly maintain the guide wires under tension while, at the same time, accommodating differential expansion and contraction of the tank and the wires.

It is a principal object of the invention to provide a novel method retaining the upper end of a tank float guide wire in a desired position.

It is a further object to provide a unique method of assembling components which permits the upper end of a tank float guide wire to be retained in a desired position in a much simpler, and consequently more economical and expedient, manner than prior assemblages designed for this purpose.

Another object is to provide a retaining method for a tank float guide wire which accomplish the desired function by taking advantage of the work hardening qualities of the wire material, thus greatly simplifying both the method and apparatus.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 1:
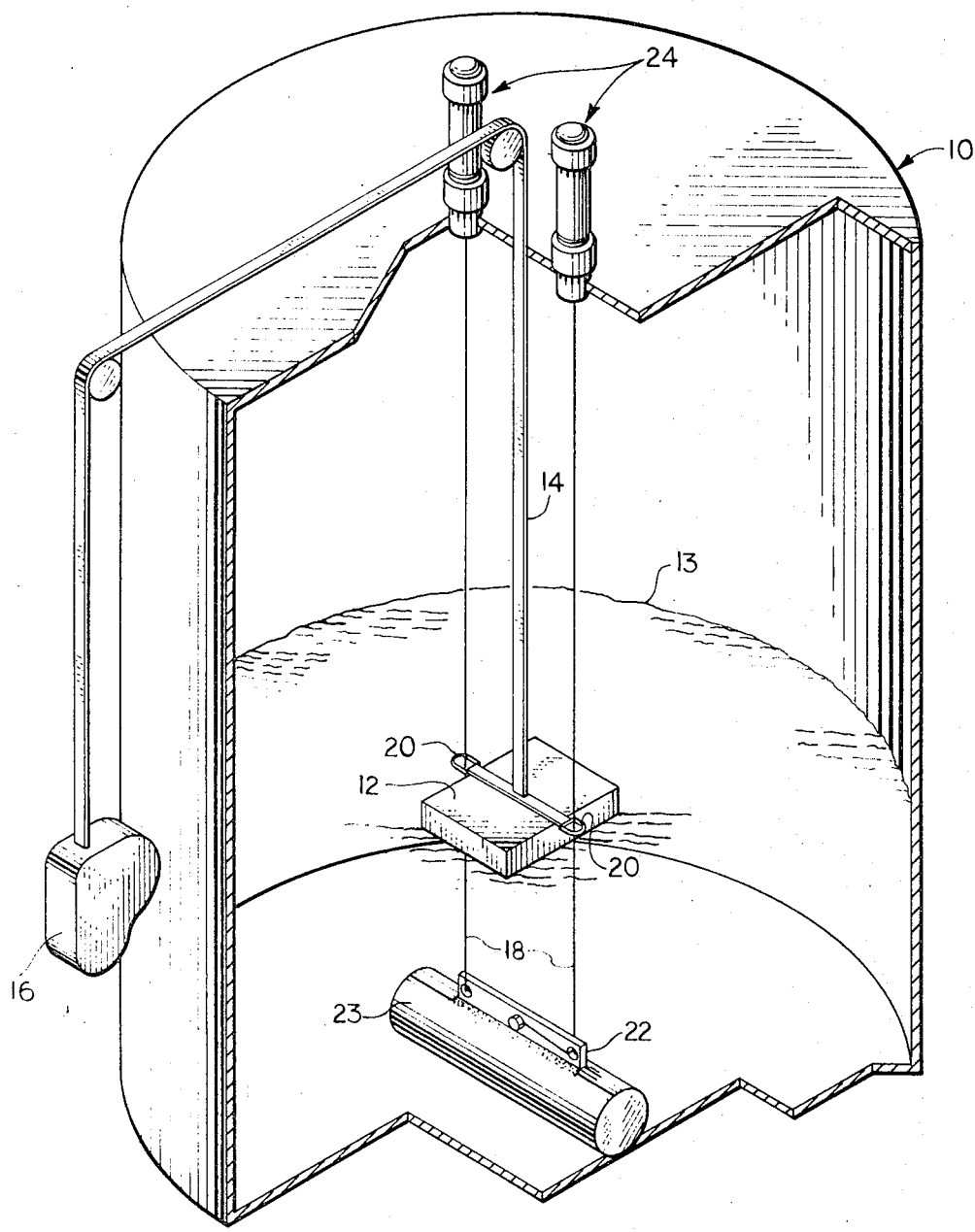
FIG. 1 is a somewhat diagrammatic, perspective view, with portions broken away, of a tank having a float device and guide wires wherein the present invention may be utilized.

In order to provide a clearer understanding of the nature of the invention and the type of apparatus with which it is associated, a typical tank level gauging arrangement is shown in FIG. 1. The reference numeral 10 denotes generally an enclosed liquid storage tank, shown with portions broken away to give a view of the gauging elements within the tank. Float device 12 is of conventional design and typically comprises a material having a high buoyancy enclosed within a metal jacket for added strength and durability. The buoyancy of the float material causes float device 12 to move vertically as the level of liquid, indicated in FIG. 1 by reference numeral 13, within tank 10 changes. The vertical position of float device 12, and hence the level of liquid within tank 10, is transmitted by means of tape 14 to gauge head 16. As shown diagrammatically in FIG. 1, tape 14 is secured at one end to float device 12 and passes vertically therefrom through the tank covering and is guided by suitable pulley arrangements, or the like, to gauge head 16. The latter is provided with means for coiling and uncoiling tape 14 as the position of the float changes, and with additional means for translating the tape position into the actual level of liquid within the tank. For example, a scale driven by tape 14 may be associated with gauge head 16 to provide a visual indication on the outside of the tank of the liquid level therein; alternatively, electronic means may be provided for sensing the tape position and transmitting a signal indicative of liquid level to a remote point where readings are to be taken.

Since the indication of liquid level provided by gauge head 16 is dependent upon the length of tape 14 between the gauge head and float device 12, it is obvious that improper readings may be obtained if the float device is allowed to move horizontally across the surface of the liquid. Therefore, it has been found convenient to provide guide means for constraining the float device to move in a straight line vertical path. Such guide means commonly take the form of a pair of strands or wires, denoted in FIG. 1 by the reference numeral 18, which pass loosely through eye means 20 on the float device. Wires 18 are secured at their lower ends to member 22, which is firmly attached to a lower interior portion of tank 10, or to a free hanging weight such as that indicated by numeral 23, and at their upper ends to retaining means indicated generally in FIG. 1 by the reference numeral 24.

It will be understood that the elements and the arrangement thereof thus far described are entirely conventional and are shown only by way of example so that the invention may be more easily understood. The invention is not limited, of course, to the specific arrangement of float, tape, gauge head, etc. shown in FIG. 1, but is intended for use in a tank level gauging arrangement wherein guide lines are provided to establish the path of movement of a float device. The invention is concerned with the retaining means, and method of assembly thereof, for the upper ends of the guide lines on the exterior of the upper wall or covering of tank 10.

Figure 2:
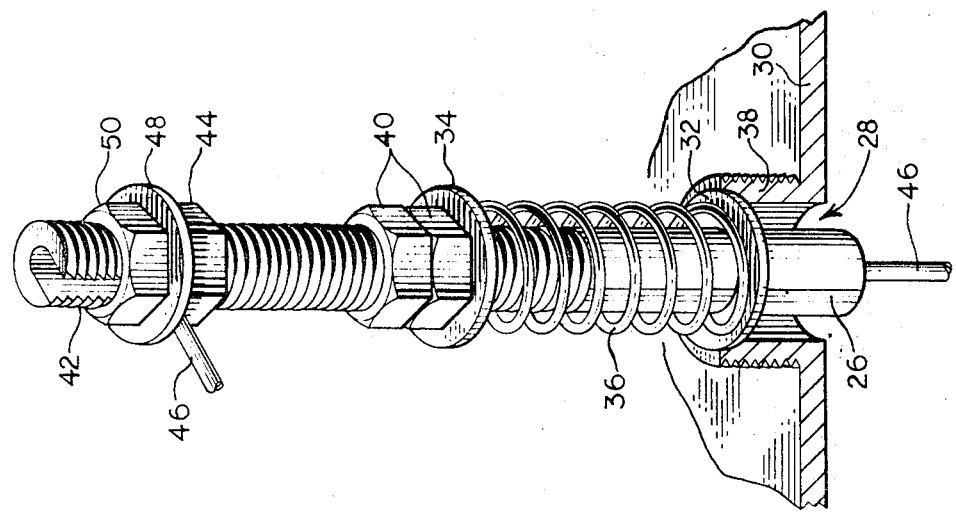
FIG. 2 is a perspective view of a typical prior art assembly which the present invention is designed to replace.

FIG. 2 illustrates a typical retaining means previously used to perform the above mentioned function. Hollow tube 26 extends loosely through opening 28 in the tank covering, a fragment of which is indicated by the reference numeral 30. Washers 32 and 34 loosely encircle tube 26, and spring 36 is positioned around the tube between the two washers. Washer 32 rests upon the surface of tank covering 30, or more commonly, on externally threaded tank nipple 38. The position of washer 34 is established by one or more nuts 40 which are threaded on an upper portion of tube 26. Thus, spring 36 may be compressed between washers 32 and 34 to exert an upward biasing force on tube 26. Open slot 42 is provided in an upper portion of the wall of tube 26 and nut 44 is threaded on the upper end of the tube to a position approximately in registration with the lower end of slot 42. Thus, guide wire 46 may be threaded through tube 26 and bent over through slot 42 against the upper surface of nut 44. Spring 32 is compressed so that the upward bias imparted to tube 26 will be transmitted to guide wire 46, thereby maintaining the latter in a tensioned condition. The guide wire is retained by clamping it between nut 44 and washer 48 which is inserted over tube 26 and held firmly against wire 46 by nut 50. After wire 46 has been thus retained in a tensioned condition the tension may be increased or decreased by lowering or raising, respectively, nuts 40 upon tube 26.

Figure 3:
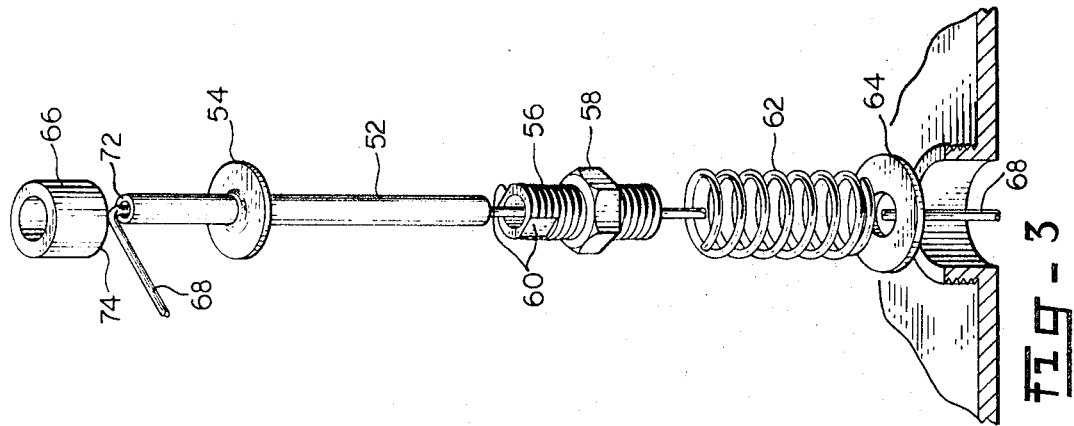
FIG. 3 is an exploded perspective in view of the elements of the present invention.

Turning now to a consideration of FIG. 3, the elements of the present invention are shown in an exploded view. The elements include hollow tube 52 having an outwardly extending flange 54 such as a washer or stamping which may be secured to tube 52 by force fit or welding. Tube 56 has an inside diameter greater than the outside diameter of tube 52 and is considerably shorter than the latter. At least a portion of tube 56 includes exterior threads so that nut 58 may be inserted thereon. Also, flat surfaces 60 are provided on the exterior of tube 56. Helical spring 62 is supported by washer 64 which loosely encircles the lower end of tube 52. Substantially cylindrical collar 66 has an inside diameter which is at least as large as, and preferably slightly larger than, the combined outside diameter of tube 52 and the largest cross sectional dimension of guide wire 68. In the practice of the present invention guide wire 68 is formed from a ductile metal which has not been work hardened. Thus, a severe bending of wire 68 actually exceeds the yield strength of the material and performs a cold working of the metal. Since cable or wire rope is normally made of work hardened metal, a single piece of ductile wire is preferred for use in the present invention. A common and suitable material for this use is austenetic stainless steel wire.

Figure 4:
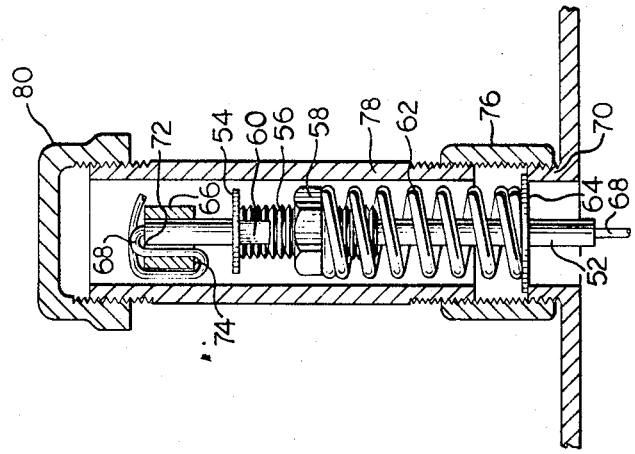
FIG. 4 is a front elevational view, partly in section, of the elements of FIG. 3 shown in the fully assembled condition.

A completely assembled view of the elements of the retaining assembly is shown in FIG. 4. In the assembly of these elements tube 52 is inserted through tube 56 with the end of tube 56 which includes flat surfaces 60 bearing against flange 54. Spring 62 is then inserted over tubes 52 and 56 with one end against nut 58. The lower end of tube 52 is then inserted through washer 64 so that the latter bears against the other end of spring 62. Guide wire 68 is threaded through tube 52 to extend out of the upper end thereof, and the assembly is positioned as shown with washer 64 resting on tank nipple 70. Guide wire 68 is then bent downwardly against upper edge 72 of tube 52 and collar 66 is inserted over both the upper end of tube 52 and the portion of guide wire 68 which is bent downwardly against the outside surface of the tube. After collar 66 has been so positioned, guide wire 68 is bent upwardly against lower edge 74 of collar 66.

The cold working of the ductile wire material, as previously noted, allows a considerable degree of tension to be exerted on the guide wire without danger of the wire becoming unbent or slipping at the upper retained end. That is, since the bending of the wire exceeds the yield strength of the metal, the wire is considerably easier to bend than it is to unbend. An additional bend in the end of the guide wire back over the top of retaining collar 66, as shown in FIG. 4, will insure that the collar cannot accidentally slip off the top of the assembly due to vibration or other forces, but this additional bend in the wire is not considered essential to the basic practice of the invention. It is to be particularly noted that the upper end of the wire is retained in the desired position solely due to the cold working of the metal by virtue of the bending, and not by frictional engagement or clamping as was universally practiced in the prior art. Although it is desirable to have a fairly snug fit of the retaining collar over the end of the hollow tube and wire for economy of space, it is by no means essential that the wire be frictionally engaged between the inside of the collar and the outside of the tube.

For completeness of showing of the invention in its final form of intended use, FIG. 4 additionally shows the conventional elements of pipe coupling 76, pipe nipple 78 and pipe cap 80. These elements are provided in conventional manner, as is the common practice with prior art devices of this type, in order to prevent tank vapors from escaping through or around hollow tube 52. Thus, although the ends of the guide wires are retained outside the tank covering the tank is still sealed.

Hollow tube 56 and nut 58 are provided solely for the purpose of allowing the tension of guide wire 68 to be adjusted after the upper end thereof has been retained in the manner described. Spring 62 exerts an upward bias on nut 58 which is transmitted, through tube 56, to flange 54 which is fixedly attached to tube 52, thus urging the upper end of guide wire 68 away from the lower end. The tension in the wire may be increased or decreased by changing the degree of compression of spring 62. This is the purpose for which flat surfaces 60 are provided on tube 56. The flat surfaces may be easily engaged by a wrench or other convenient tool in order to rotate tube 56. Since nut 58 is frictionally engaged by the upper end of spring 62 the nut will not rotate, but will be moved up or down due to the rotation of tube 56 upon which it is threaded.

The invention may be further simplified, if desired, by eliminating the spring adjustment means described in the preceding paragraph. That is, tube 56 and nut 58 may be omitted, thereby allowing the upper end of spring 62 to bear directly upon flange 54. In this case the spring may be compressed to the desired degree by pushing downwardly on flange 54 and then bending wire 68 over edge 72 to hold the elements in position while inserting collar 66 and performing the additional bending on wire 68. However, the provision of spring force adjusting means such as tube 56 and nut 58 is preferred in applications where the amount of compression of the spring, and thereby the degree of tension in wire 68 is rather critical.

It will thus be seen that the objects set forth above, among those made apparent from the preceding description, are efficiently attained, and since certain changes may be made in the above construction without departing from the scope of the invention, it is intended that all matter contained or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. The method of fixedly retaining one end of a ductile metal wire in a desired position, said method comprising the steps of:
   (a) threading said one end through a hollow tube which extends from an anchoring means;
   (b) bending said wire back upon itself over the edge of said tube;
   (c) inserting a substantially cylindrical collar over said tube, whereby said collar encircles both a portion of said tube and the portion of said wire bent thereover; and
   (d) bending said wire back upon itself a second time, outside of said collar and against the edge thereof.

2. The method according to claim 1 and further including the step of adjusting the tension of said wire to a predetermined amount.

3. The method according to claim 2 wherein the step of adjusting the tension includes inserting a compression spring between said anchoring means and means affixed to said tube, whereby the latter is biased away from said anchoring means by said spring.

References Cited

UNITED STATES PATENTS

| | | | |
|---|---|---|---|
| 1,865,808 | 7/1932 | Abegg | 29—439 |
| 2,965,356 | 12/1960 | Cheskin | 29—452 X |
| 3,069,764 | 12/1962 | Swats et al. | 29—173 X |
| 3,139,476 | 6/1964 | Alvarez | 29—452 X |
| 3,359,625 | 12/1967 | Rossnan | 29—436 |

THOMAS H. EAGER, *Primary Examiner.*

U.S. Cl. X.R.

29—173, 436; 73—306